United States Patent [19]
Sköld et al.

[11] Patent Number: 6,139,099
[45] Date of Patent: Oct. 31, 2000

[54] METHOD OF AND AN ARRANGEMENT FOR INSTALLING A CHILD CAR SEAT

[75] Inventors: Björn-Åke Sköld, Norrköping; Claes Tingvall, Leksand; Anders Kullgren, Tullinge, all of Sweden

[73] Assignee: Barn-I-Bil AB, Stockholm, Sweden

[21] Appl. No.: 09/171,492

[22] PCT Filed: Apr. 22, 1997

[86] PCT No.: PCT/SE97/00679

§ 371 Date: May 5, 1999

§ 102(e) Date: May 5, 1999

[87] PCT Pub. No.: WO97/39913

PCT Pub. Date: Oct. 30, 1997

[30] Foreign Application Priority Data

Apr. 22, 1996 [SE] Sweden ................................ 9601521

[51] Int. Cl.⁷ ...................................................... B60N 2/28
[52] U.S. Cl. .................................. 297/250.1; 297/216.11; 297/256.14
[58] Field of Search ........................... 297/216.11, 250.1, 297/256.14, 256.15

[56] References Cited

U.S. PATENT DOCUMENTS

| | | |
|---|---|---|
| 5,052,749 | 10/1991 | Groenendijk . |
| 5,383,708 | 1/1995 | Nagasaka et al. ................. 297/250.1 |
| 5,468,014 | 11/1995 | Gimbel et al. ................. 297/216.11 X |
| 5,722,720 | 3/1998 | Lumley ........................ 297/216.11 |

FOREIGN PATENT DOCUMENTS

| | | |
|---|---|---|
| 0603733A1 | 6/1994 | European Pat. Off. . |
| 4031718 | 4/1992 | Germany ............... 297/250.1 |
| 9400114A | 9/1995 | Netherlands . |
| 504 732C2 | 1/1994 | Sweden . |
| 85000563 | 2/1985 | WIPO ...................... 297/250.1 |

*Primary Examiner*—Peter R. Brown
*Attorney, Agent, or Firm*—Burns, Doane, Swecker & Mathis, L.L.P.

[57] ABSTRACT

A method of and an arrangement for installing a rear-facing child car seat (1) employing a supporting arm (5), mounted on the child seat, which is folded into pressing engagement with the backrest part (13) of the passenger seat. Prior to this, engagement means (33) on the child seat has been caused to engage with fastening means (23) in the car in the transition area between the backrest (13) and the seat (9) of the passenger seat. In a preferred embodiment, the fastening means has a cable loop and the engagement means has a hook means coacting with the loop. For after-tightening of the engagement, there are special after-tightening means (17), which forcibly increases the folding of the supporting arm and/or achieves a retraction of the engagement means (33) for further tightening of the engagement with the fastening means (23).

29 Claims, 10 Drawing Sheets

METHOD OF AND AN ARRANGEMENT FOR INSTALLING A CHILD CAR SEAT

TECHNICAL FIELD

The present invention relates to a method of installing a rear-facing child car seat on a passenger seat in a car, which child seat comprises a seating part and a supporting arm projecting from the seating part, which supporting arm is foldable away from and towards the seating part, the child seat being placed in a working position with the seating part on the seat part of the passenger seat and with the supporting arm folded against the backrest part of the passenger seat and being anchored in this position. The invention also relates to an arrangement for such an installation.

PRIOR ART

Installation methods of the kind mentioned above have been used for many years in connection with a non-folding as well as a folding supporting arm, the required anchoring normally being achieved with the aid of the seat belts of the car or similar special straps.

Although such anchoring generally has turned out to function well, the use of the seat belt of the car means that the installation becomes somewhat complicated and that the anchoring may be unsatisfactory if the tightening of the seat belt is not done with great care.

It has also been suggested that the anchoring of child car seats should be standardised by employing special fastening means arranged in the car, such as two fastening members at the front edge of the child seat and two fastening members at the back edge of the child seat. However, it has not yet been possible to establish such a standard.

OBJECT OF THE INVENTION

The object of the present invention is to provide a method of and an arrangement for installing child car seats, whereby the need for employing the seat belt of the car for the anchoring is eliminated, whereby the anchoring is very simple, secure, flexible and inexpensive, whereby the required fastening means in the car are simple and easy to install and furthermore can be designed in a way that does not require a fixed arrangement in the car, and whereby no impediments are created which might make it difficult for car manufacturers to introduce their own new specific design solutions.

SUMMARY OF THE INVENTION

The above-mentioned object is achieved by a method and an arrangement which exhibit the features stated in the appended claims.

The basis of the invention is thus an understanding of the fact that the anchoring of a child car seat, placed in a working position, which is being held in place by a combination of supporting arm engagement with the backrest part of the passenger seat and child seat engagement with special fastening means in connection with the transition between the backrest part and the seat part of the passenger seat, can advantageously be achieved by employing the folding movement of the supporting arm for making contact with the backrest part. In other words, when the child seat has been placed on the seat part of the passenger seat and initial engagement with said fastening means has been achieved, the anchoring engagements are tightened by the supporting arm being folded from a folded-back position closer to the seating part of the child seat to a lowered position with the supporting arm, preferably at least its free end part, in pressing engagement with the backrest part of the passenger seat. To the skilled person it will easily be apparent that the required support for the seating part of the child seat can suitably be obtained from the seat part of the passenger seat and/or the dashboard of the car and/or a special support against the floor of the car, the latter suitably by means of a leg fixed to the back of the child seat, which leg can be locked in the required extended position.

According to the invention, it has been found to be particularly advantageous to use a two-step anchoring system. Thus, in the first step, basic anchoring is achieved by the supporting arm being pushed by hand to an initial engagement with the backrest part of the passenger seat. In the second step, final anchoring is achieved by means of a special after-tightening operation, which preferably is effected by the utilisation of increased "gearing", for example by means of a lever-operated after-tightening means, so that increased tensional force can easily be achieved.

With respect to the after-tightening operation, the skilled person will appreciate that there are several possibilities. However, according to the invention it is preferred that the after-tightening operation comprises a further lowering of the supporting arm and/or an increase of the tension in the engagement itself with said fastening means.

For the engagement between the child car seat and said fastening means, use is suitably made of engagement means specially arranged on the child seat, which are movable in relation to the child seat and are adapted to be brought back or pulled back, in connection with the anchoring of the child seat, from a projecting or exposed position in order to achieve engagement with said fastening means to a retracted or pulled back tightened position.

According to one embodiment of the invention, the movement of said engagement means is achieved by completely separate actuation means, i.e. independently of the position of the supporting arm.. According to another embodiment of the invention, the movement of said engagement means is adapted to be controlled by the folding movement of the supporting arm. This can suitably be achieved by said engagement means being linked to the supporting arm.

It will be appreciated that a coupling of the movement of said engagement means to the folding movement of the supporting arm means that a "double" tightening action is achieved in connection with the folding of the supporting arm. Firstly, the folding of the supporting arm results in a tightening action in that the supporting arm tends to displace the child seat in the direction away from the backrest part of the passenger seat, which tightens the engagement between said engagement means and said fastening means. Secondly, the folding of the supporting arm results in a simultaneous retraction of said engagement means relative to the child seat itself, whereby the engagement between said engagement means and said fastening means as such is also tightened.

According to one embodiment of the invention, the after-tightening is achieved with the aid of after-tightening means acting upon the supporting arm, the means comprising a tightening arm which is mounted in both the seating part of the child seat and in the supporting arm, one of the mountings being movable and the means operating the after-tightening being arranged for geared action on the movably mounted part of the tightening arm, so that a further folding, after-tightening the engagement, is thus forced on the supporting arm. Said operating means can advantageously comprise a lever-operated cam means, which acts upon the tightening arm and which preferably is arranged on the supporting arm.

According to another embodiment of the invention, the after-tightening is achieved with the aid of after-tightening means acting directly or indirectly upon said engagement means only, which, in this case, by means of suitable increased gearing achieves a pulling back or retraction of said engagement means towards the child seat. In this case, too, it is advantageous to arrange an after-tightening lever on the supporting arm.

Conveniently, said after-tightening means are adapted to secure the supporting arm in the lowered tightened position as well.

Said fastening means may advantageously comprise a locking cable, which has a forward-facing engagement loop in connection with the transition between the backrest part and the seat part of the passenger seat. It will be appreciated that such a loop can be arranged very easily in connection with different kinds of passenger seats and that it also makes it possible to employ engagement means of simple design on the child seat, e.g. a hook-shaped means. Such a means can easily be arranged for desired movement relative to the child seat itself and can also easily be coupled to a tightening lever mechanism.

Although said fastening means easily can be fixedly installed in a car, for example by employing existing fastening points for seat belts, according to the invention it is possible, and in many cases preferable, for said fastening means to be removably arranged in connection with the passenger seat and comprise holding-on means adapted to be placed on the back of the passenger seat in the transition between the backrest part and the seat part. It will be appreciated that, when a locking cable loop is employed, this loop can be applied very easily through the transition area between the backrest part and the seat part of a passenger seat.

The invention will be described in more detail below by way of embodiments with reference to the accompanying drawings.

DESCRIPTION OF EMBODIMENTS

The child car seat 1 shown in the drawing has a seating part 3 and a supporting arm 5 foldably connected to it. The seating part is essentially formed according to the description in our earlier Swedish patent applications Nos 9103257-3 and 9202146-8 (to which reference hereby is made with respect to design details), although it has been suitably modified with respect to the mounted attachment of the supporting arm. Thus, the seating part has an inner reinforcement frame which is not shown in detail, and which at the front adjacent to the foot end of the child seat has a transverse frame part, on which the seating part end of the supporting arm is centrally mounted. The supporting arm 5 is formed as an angled continuous arm, whose width is small enough to easily allow a child sitting in the seating part of the child seat to have his feet on both sides of the supporting arm.

Figure 1:
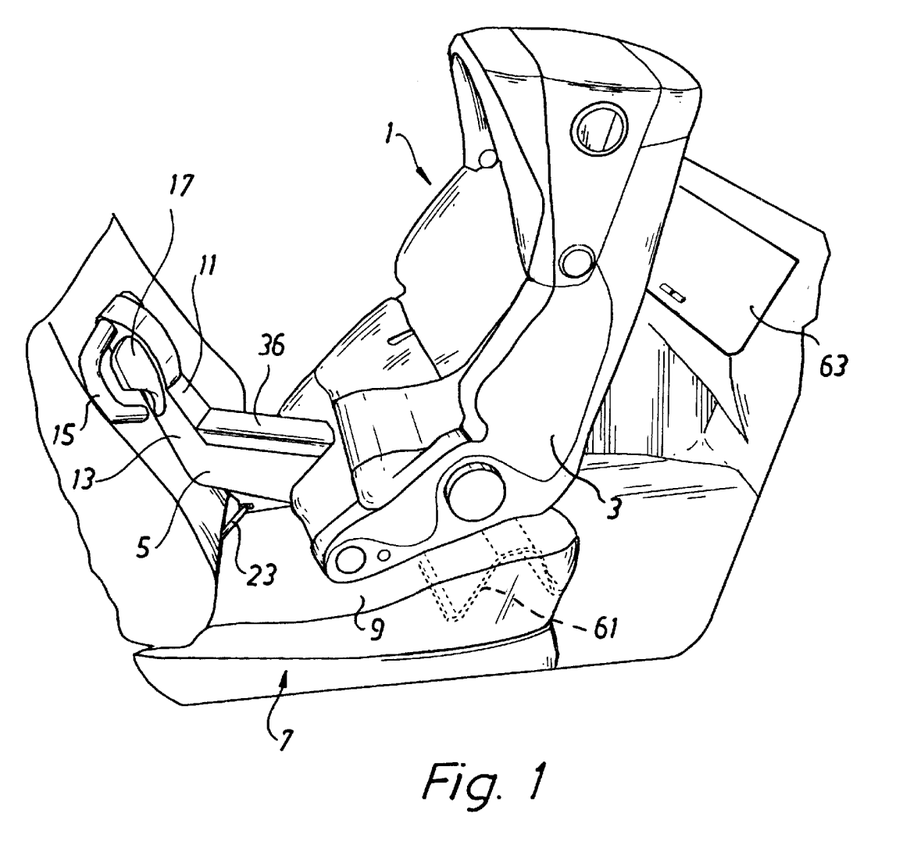
FIG. 1 is a schematic perspective view illustrating an example of an installation of a child car seat in the front seat of a car according to an embodiment of the present invention.
Figure 2:
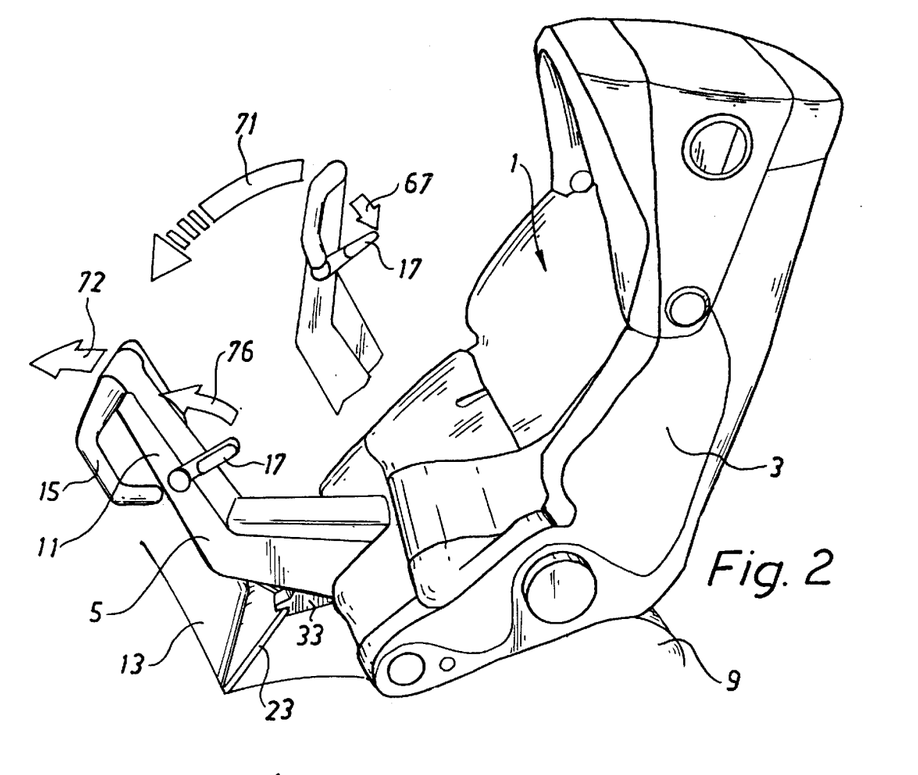
FIG. 2 is a schematic view, similar to the one in FIG. 1, illustrating the fastening of the child seat utilising the supporting arm of the seat.

As illustrated in FIGS. 1 and 2, in a first embodiment, the seating part 3 of the child seat is placed with its underside, which is adapted for this purpose, on the seat part 9 of a passenger seat 7, while the upwardly angled, free end part 11 of the supporting arm 5 is in contacting engagement with the backrest part 13 of the passenger seat. At the top of the end part 11 there is a supporting arm operating-handle 15 and a special after-tightening handle 17, as will be described in more detail below.

Furthermore, for anchoring the child seat, there is a locking cable 19 fixed to the passenger seat and a hook means 21 on the child seat which is intended to engage with the locking cable, as illustrated in more detail in FIGS. 2–5. The locking cable forms a loop 23, which lies exposed on the seat part of the passenger seat in the transition between the seat part and the backrest part. The locking cable can be attached to the car in an arbitrary suitable manner, e.g. by employing attachment points for seat belts, but it has been found satisfactory to install the locking cable in the manner which can be seen in FIG. 5. Here, the locking cable is fixed to a bracket-shaped holder-on 25, which is placed on the back of the passenger seat in the transition between the backrest part and the seat part, the cable being pulled out through the gap between the backrest part and the seat part to form the exposed, easily accessible cable loop. As a rule, no special fixing of the holder-on is needed.

The hook means 21 is mounted by its back end on the mounting end of the supporting arm 5 in a recess 27 in said end. The mounting point 29 of the hook means is eccentric in relation to the mounting point 31 of the supporting arm (see e.g. FIG. 7), so that the hook means is pushed out from the seating part of the child seat when the supporting arm is folded back towards the seating part (see FIGS. 3 and 8), and so that the hook means is retracted into the seating part when the supporting arm is folded from the seating part (see FIGS. 4 and 9). In this connection, the hook means is simultaneously folded into the recess 4.

Figure 3:
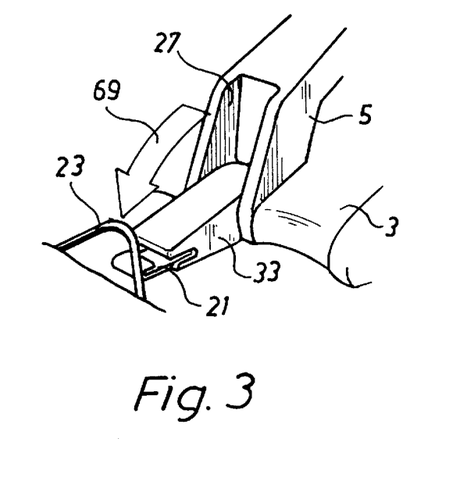
FIGS. 3 and 4 are schematic partial perspective views illustrating the achievement of engagement between a hook-engagement means arranged on the child seat and a locking cable arranged in the car.
Figure 4:
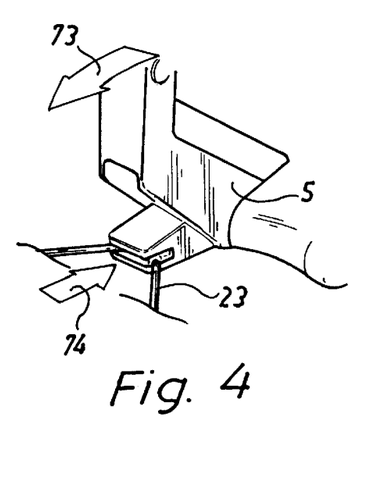
Figure 5:
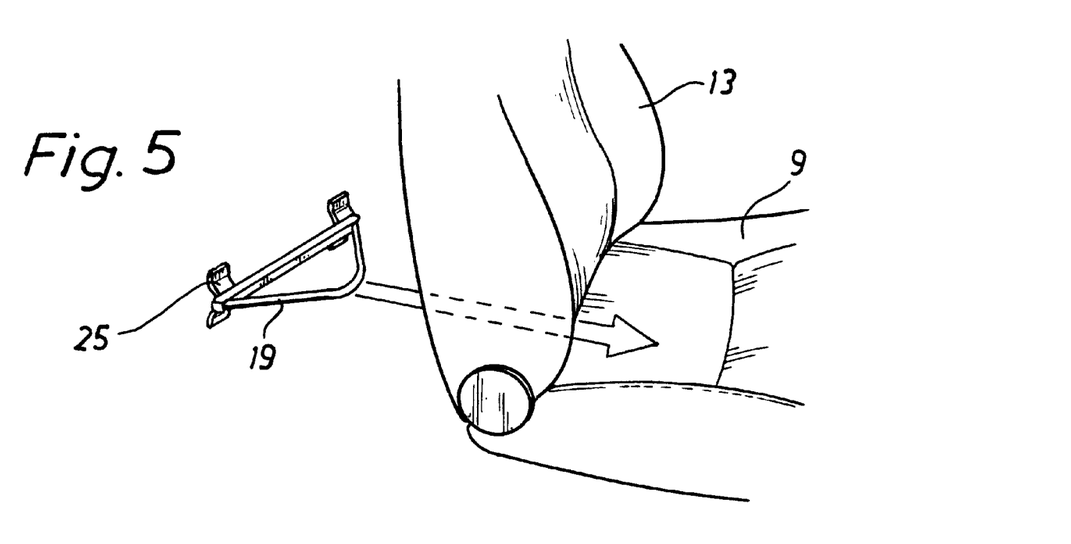
FIG. 5 is a schematic perspective view illustrating an example of the arrangement of the locking cable on the passenger seat.
Figure 6:
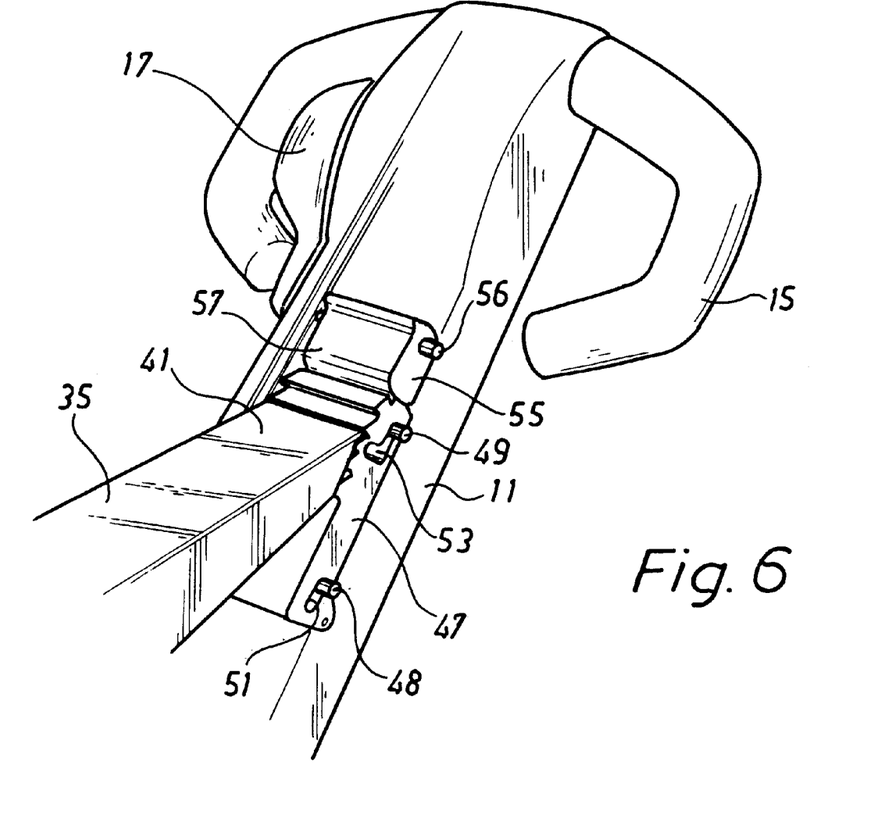
FIG. 6 is an enlarged partial perspective view of the supporting arm with a tightening arm arranged therein (whereof only essential parts are shown), illustrating the principle of achieving after-tightening according to a preferred embodiment of the invention.

As can be seen in FIGS. 3 and 4, the hook means 21 is provided with a casing 33 mounted in the supporting arm, which casing completely surrounds the hook means when this is retracted, and allows the outer hook part of the hook means to be exposed for engagement with the locking cable, when the hook means 21 is pushed out. As will easily be appreciated, this means that the final engagement between the locking cable and the hook means is secured in a working position.

The after-tightening mechanism used in this first embodiment is based on a forced increase in the lowering of the supporting arm 5 by the use of a tightening arm 35 (see FIGS. 6–11). The tightening arm 35, which is arranged in the supporting arm 5 inside a supporting arm casing 36 (removed in FIG. 6) and therefore not visible in FIG. 2, has one end 37 nondisplaceably mounted at 38 in the generally outlined frame construction 39 of the seating part. The other end 41 of the tightening arm is movably mounted at 42 in the upwardly angled part 11 of the supporting arm by means of a mounting pin which is displaceable in a longitudinal groove 43 in the supporting arm part 11 (see FIG. 9). The tightening arm end 41 has a lug 45 for coaction with a toothed segment 47, arranged with limited mobility in the tightening arm, whose toothed surface is turned towards the tightening arm and its lug 45.

The toothed segment 47 is mounted on two parallel mounting pins 48, 49, which are fixed to the supporting arm and which are perpendicular to the plane of movement of the supporting arm. A lower pin 48 coacts with an elongated lower recess 51 in the toothed segment, which lower recess extends essentially parallel to the groove 43. An upper pin 49 coacts with an essentially L-shaped upper recess 53 in the toothed segment. The toothed segment is biased with the aid of a tension spring 54, which is connected to the lower end of the toothed segment and tends to pull the toothed segment upwards in the supporting arm 5.

The toothed segment 47 can be acted upon with the aid of a cam means 55, which is mounted on a pin 56 and has a cam surface 57 coacting with an end surface 59 on the toothed segment. The cam means can be turned on the pin 56 by means of the after-tightening handle 17 functioning as a lever.

The installation of a child car seat according to the described first embodiment is carried out in the following manner. The child seat 1 with the supporting arm 5 folded back and secured, which supporting arm thereby can be used to carry the child seat, is lifted into the car and placed on the seat part 9, where, in general, it is supported from below by the inner seat riser 61 of the seat part (FIG. 1). As an alternative or a complement, the child seat can be placed so that it also rests against the dashboard 63. It is also possible to arrange a special supporting leg on the back of the child seat, which leg can rest against the floor of the car, as in the second embodiment described below.

Figure 7:
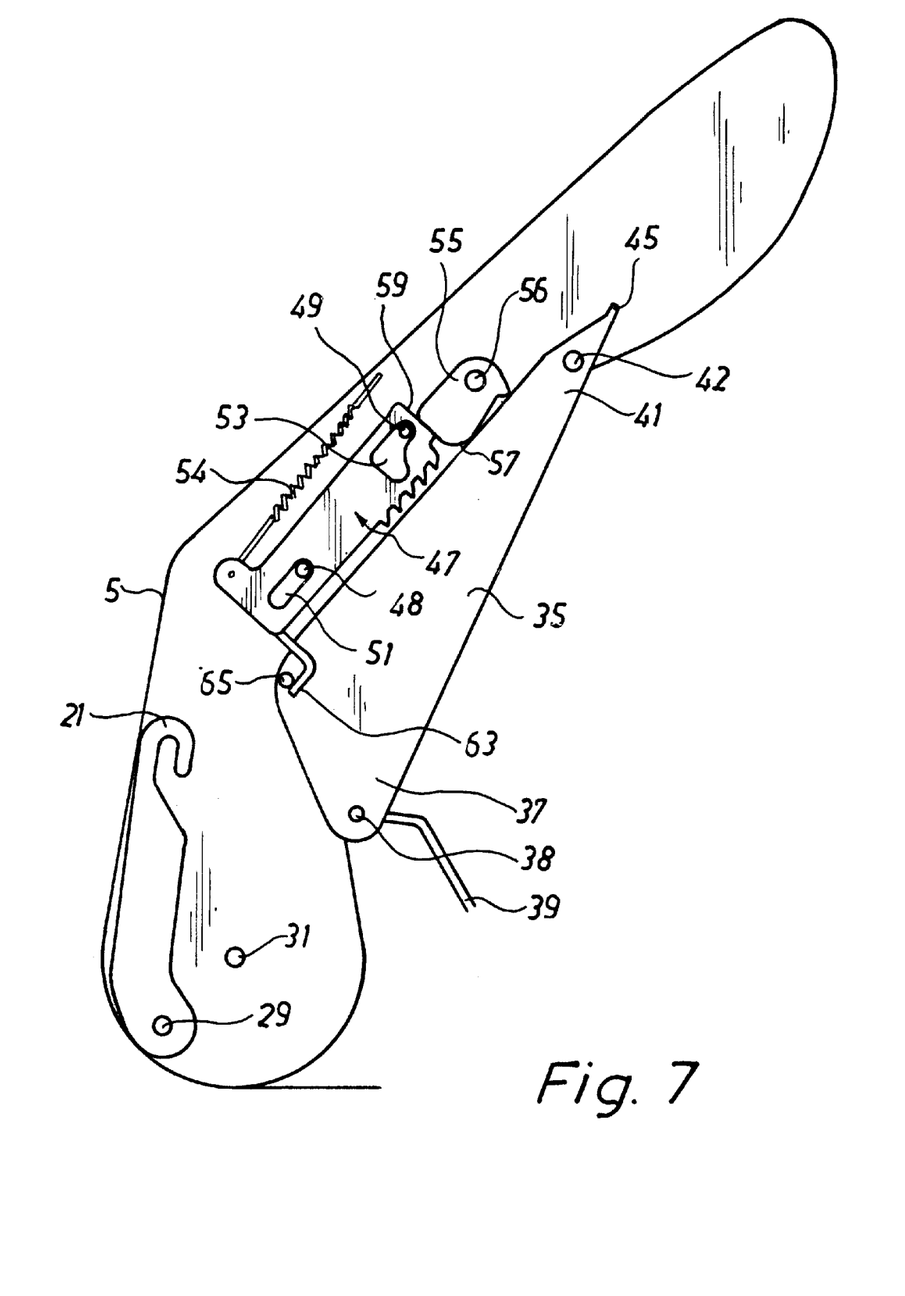
FIGS. 7–11 are schematic side views of the supporting arm of the child seat and the associated after-tightening mechanism, illustrating different phases of the fastening according to the embodiment shown.

The position with a folded-back and secured supporting arm is shown in FIG. 7. In this connection, the handle 17 is folded in, i.e. raised up to lie along the supporting arm part 11. The cam means 55 is turned down, so that the essentially flat end part of its cam surface 57 bears against the end surface 59 of the toothed segment 47 and presses the toothed segment down to a lower end position, in which the pins 48, 49 lie in the upper-most part of the respective recesses 51, 53. The pivot pin 42 of the tightening arm 35 is located in the upper-most part of the groove 43 and the tightening arm is disengaged from the toothed segment 47. The position is secured by the fact that a catch 63 projecting from the lower end of the toothed segment is catching on a pin 65 on the tightening arm 35.

Figure 8:
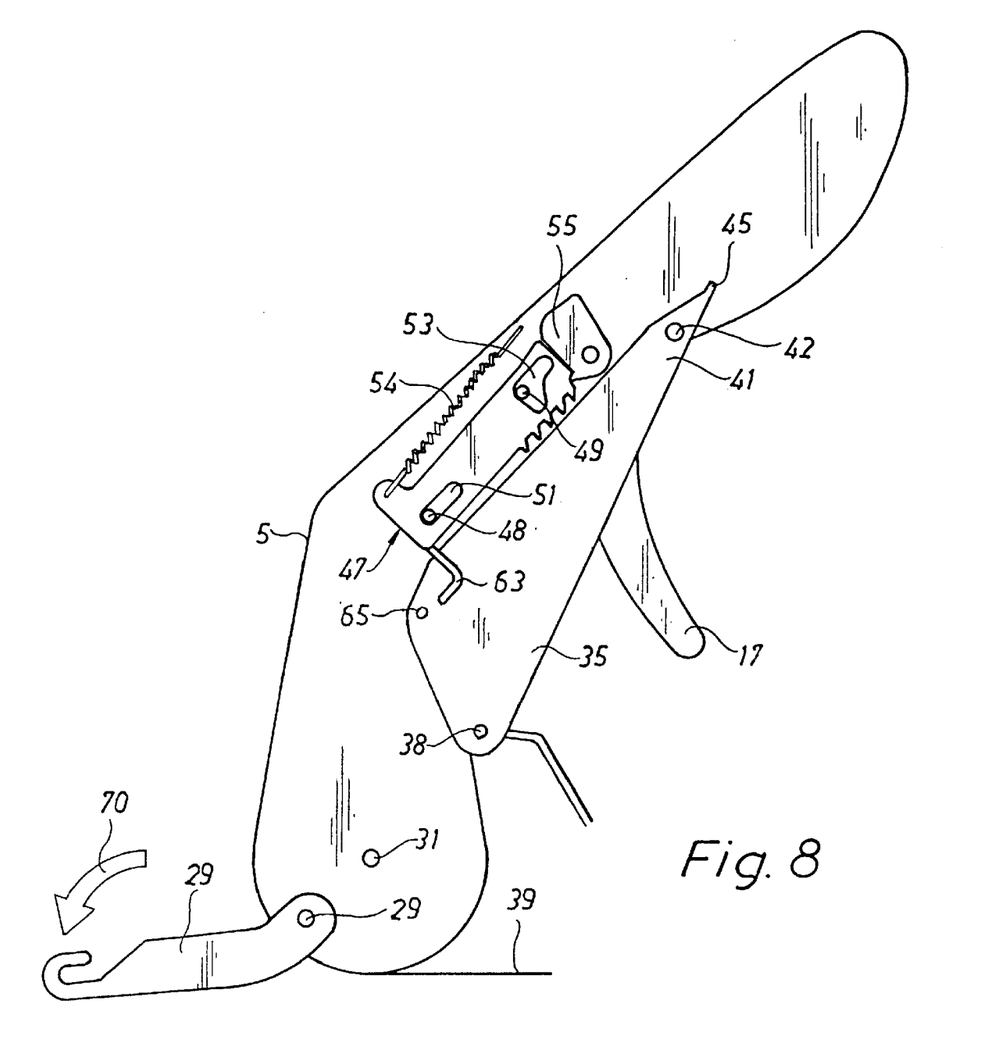

In the next stage, the handle 17 is "released" by being folded out to the position shown in FIG. 8.

This is also indicated by the arrow 67 in FIG. 2. In this connection, the cam means 55 is turned, so that the toothed segment 47 is allowed to be displaced upwards by the action of the spring 54, whereby the engagement of the catch 63 with the pin 65 ceases and the supporting arm 5 is free to be lowered. Now, the hook means 21 and the associated casing 33 are also folded by hand out of the recess 27. This is illustrated by the arrows 69 and 70 in FIGS. 3 and 8. Since the supporting arm 5 still is folded back, the hook end of the hook means 21 is exposed, and the cable loop 23 can easily be caused to engage with the hook means.

Figure 9:
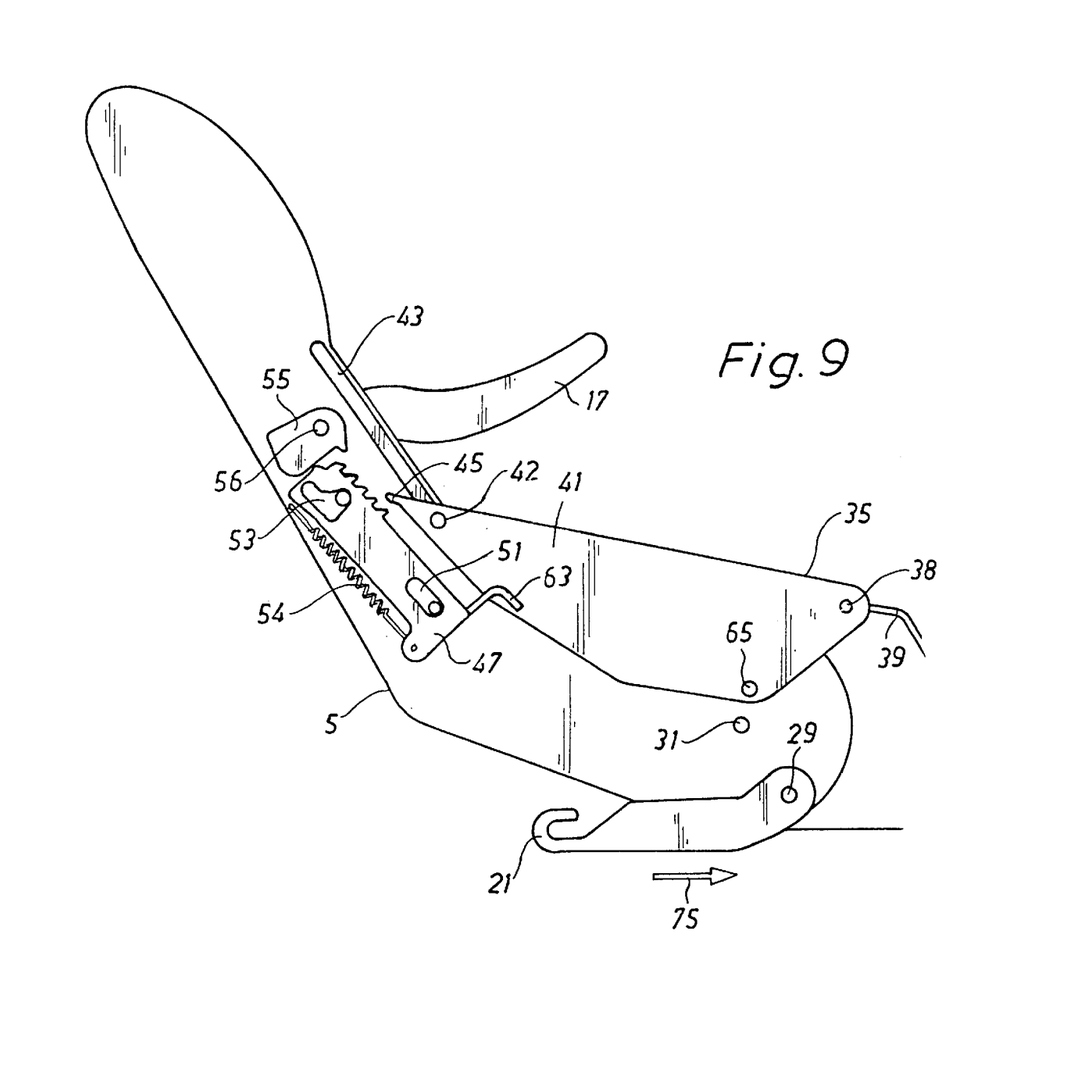

Next, the supporting arm is folded out to engage with the backrest part 13 of the passenger seat, as illustrated by the arrows 71, 72 and 73 in FIGS. 2 and 4. In this connection, simultaneously, the hook means 21, with the connected cable loop 23, is pulled into the seating part 3, as shown by the arrows 74 and 75 in FIGS. 4 and 9, whereby the position according to FIG. 9 is achieved. In this position, the supporting arm 5 is pressing against the backrest part of the passenger seat, while the locking cable is tightened and the seating part of the child seat is pressing downwards against the seat part of the passenger seat.

In order to achieve the position according to FIG. 9, the movably mounted end 41 of the tightening arm has moved downwards in the supporting arm 5, the pin 42 having slid in the groove 43 and the end of the tightening arm having slid downwards over or past the obliquely downward-pointing teeth of the toothed segment 47. At the same time, the toothed segment 47 has been caused to turn around its lower mounting pin 48 away from the tightening arm 35, which is possible thanks to the transverse part of the L-shaped recess 53. Although it is not shown in FIG. 9, the lug 45 of the tightening arm can now be in initial engagement with the teeth of the toothed segment 47, so that the supporting arm cannot move backwards.

Figure 10:
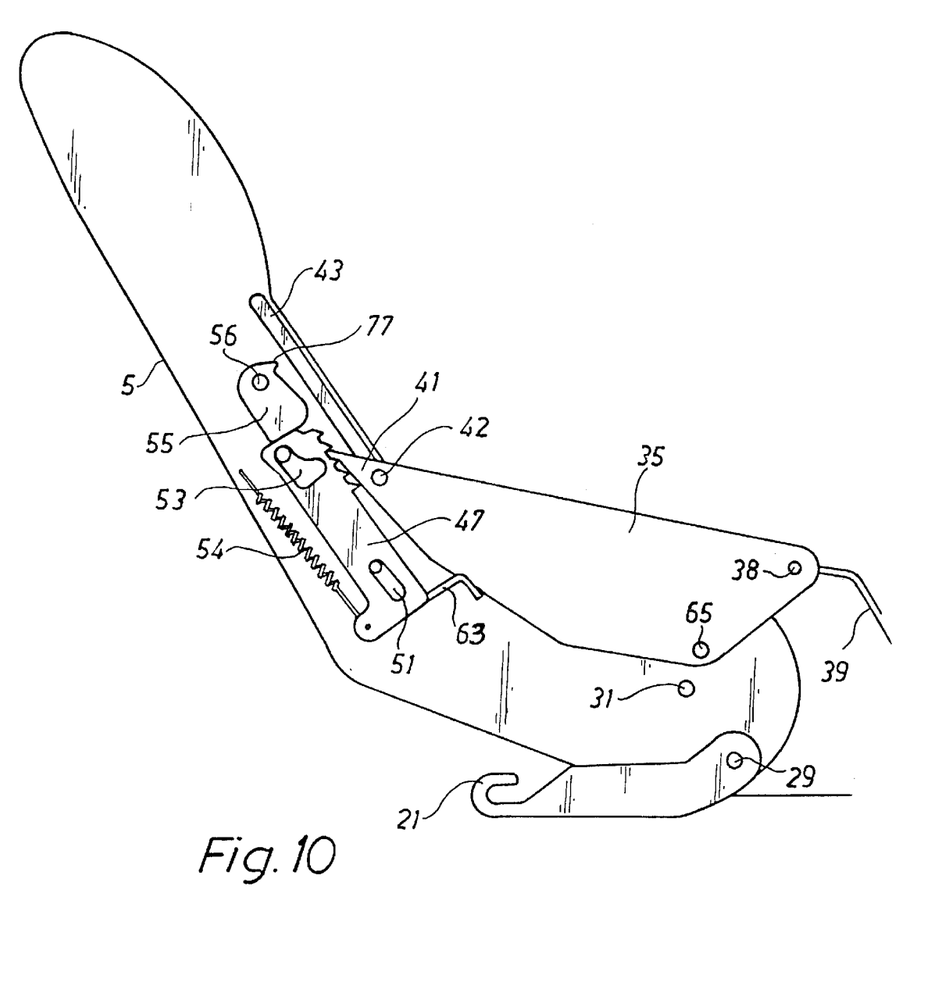

In the next step, the engagement achieved is secured and after-tightening effected by the handle 17 being brought back to its folded position, whereby the position according to FIG. 10 is achieved. The folding of the handle 17 functioning as a lever, illustrated by the arrow 76 in FIG. 2, results in the cam means 55 being turned back to the position shown in FIG. 7 under forced action on the toothed segment 47. The toothed segment is thus forced both to move downwards in the supporting arm 5, and, in this connection, initially, to be turned around its lower mounting pin 48 towards the tightening arm 35, whose lug 45 hereby is secured in engagement with the teeth of the toothed segment. The downward movement of the toothed segment 47 means that the mounting of the tightening arm 35 is forced down in the supporting arm, i.e. the pin 42 is displaced further down in the groove 43. Since the tightening arm is nondisplaceably mounted in the seating part of the child seat, this means that the lowering of the supporting arm is forcibly increased with an accompanying further tightening of the engagement. By virtue of the supporting arm 5 further being lowered, the hook means 21, too, is pulled somewhat further in towards the seating part because of its eccentric mounting 29 on the end of the supporting arm, whereby the engagement itself with the cable loop 23 is after-tightened as well.

When the handle 17 is folded in completely, the cam-surface contact of the cam means 55 with the end surface 59 of the toothed segment 47 has passed a "dead centre", which means that the position achieved is secured.

Figure 11:
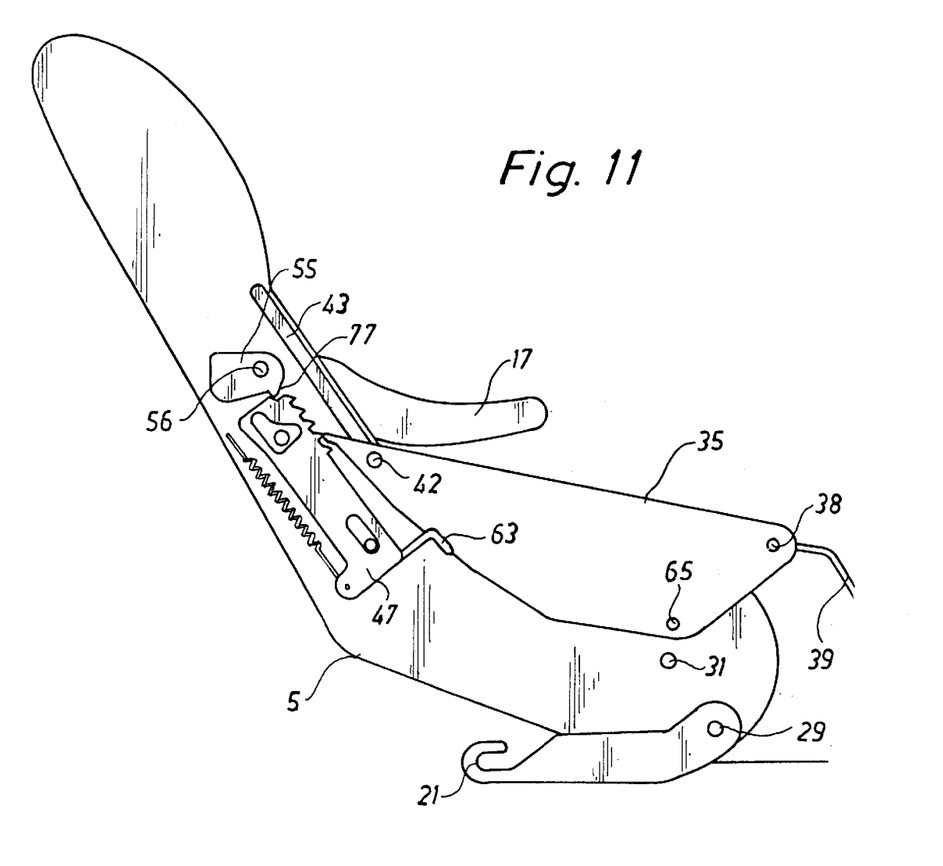
Figure 12:
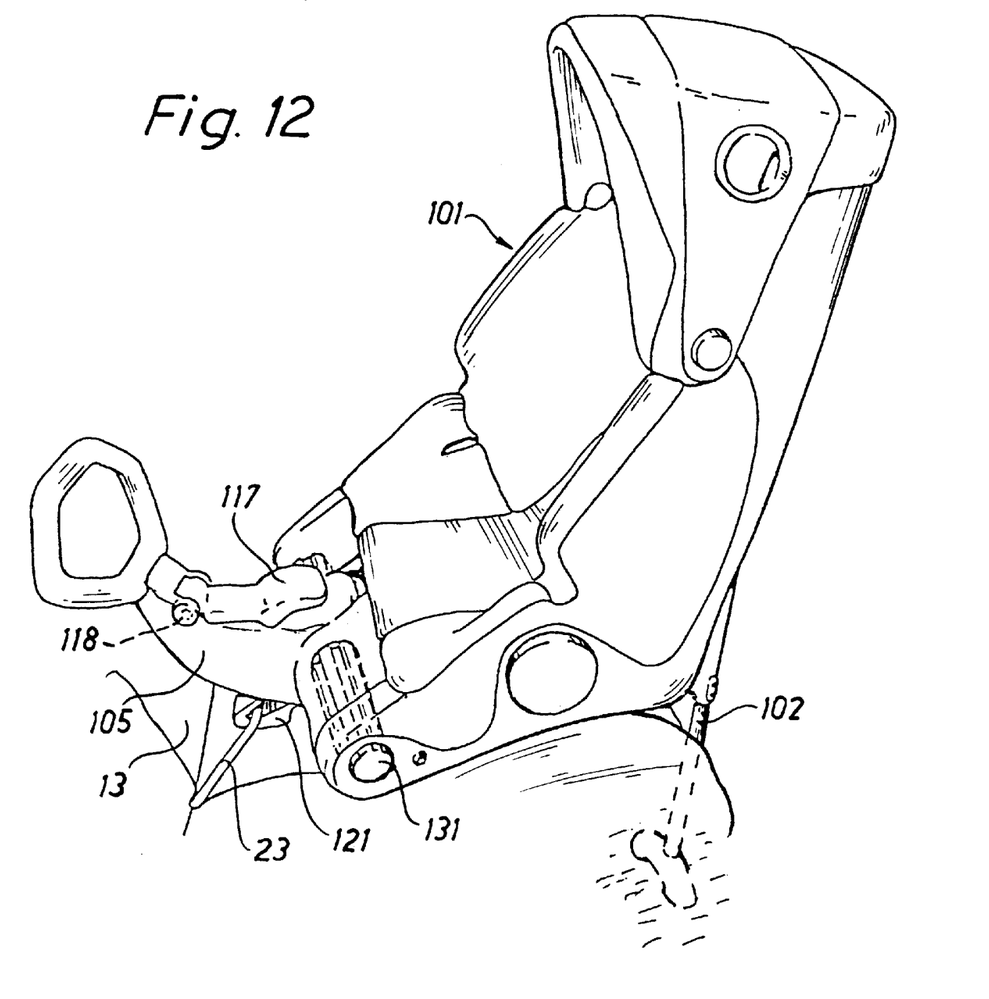
FIG. 12 is a schematic view of the same kind as FIG. 1 and illustrates a second embodiment of the present invention.

In order to undo the fastening of the child seat, one lowers the handle 17 again, so that the position shown in FIG. 11 is achieved. In this connection, the handle 17 has been lowered maximally to a position somewhat more lowered than in FIG. 8. In the position in FIG. 11, a nose 77 on the cam means 55 has pushed the toothed segment 47 somewhat further back, i.e. turned the toothed segment around its lower mounting pin 48, so that the end of the tightening arm 35, i.e. the lug 45, is clear of the toothed segment 47, whereby the end of the tightening arm can move freely in the supporting arm 5. Thus, the supporting arm can now be folded back in order for the engagement with the backrest part as well as the engagement with the locking cable to be released and thereafter for the secured position shown in FIG. 7 to be resumed, for example for removal of the child seat. Prior to this, conveniently, the hook means 21, too, has been folded by hand back into the recess 27.

FIGS. 12–15 illustrate a second embodiment of the present invention. The child car seat 101 according to this embodiment differs from the embodiment according to FIGS. 1–11 essentially only with respect to the mounting of the supporting arm 105 and the after-tightening mechanism employed, and consequently the description below will concentrate on this. Moreover, it should be noted that the child seat 101 here has a supporting leg 102 attached to its back, which leg is extendible downwards and can be locked in a suitable extended position in order to provide support for the child seat against the floor of the car.

The supporting arm 105 is centrally rotatably arranged on a fixed, transverse, cylindrical shaft 131, which forms part of the frame structure of the child seat and which is provided with longitudinal splines distributed around its circumference. On each side of the supporting arm mounting, first, there is a mounting plate 133 for the hook means 121 freely rotatably arranged on the shaft 131 (see FIG. 14). The hook means 121 is thus rotatably mounted at 135 on each side of the supporting arm mounting close to the periphery of the respective plates 133. An end of a link arm 137 is mounted diametrically opposite the mounting 135 at 139 close to the periphery of the plate 133 as well, as will be described in more detail below.

Figures 13, 14, 15:
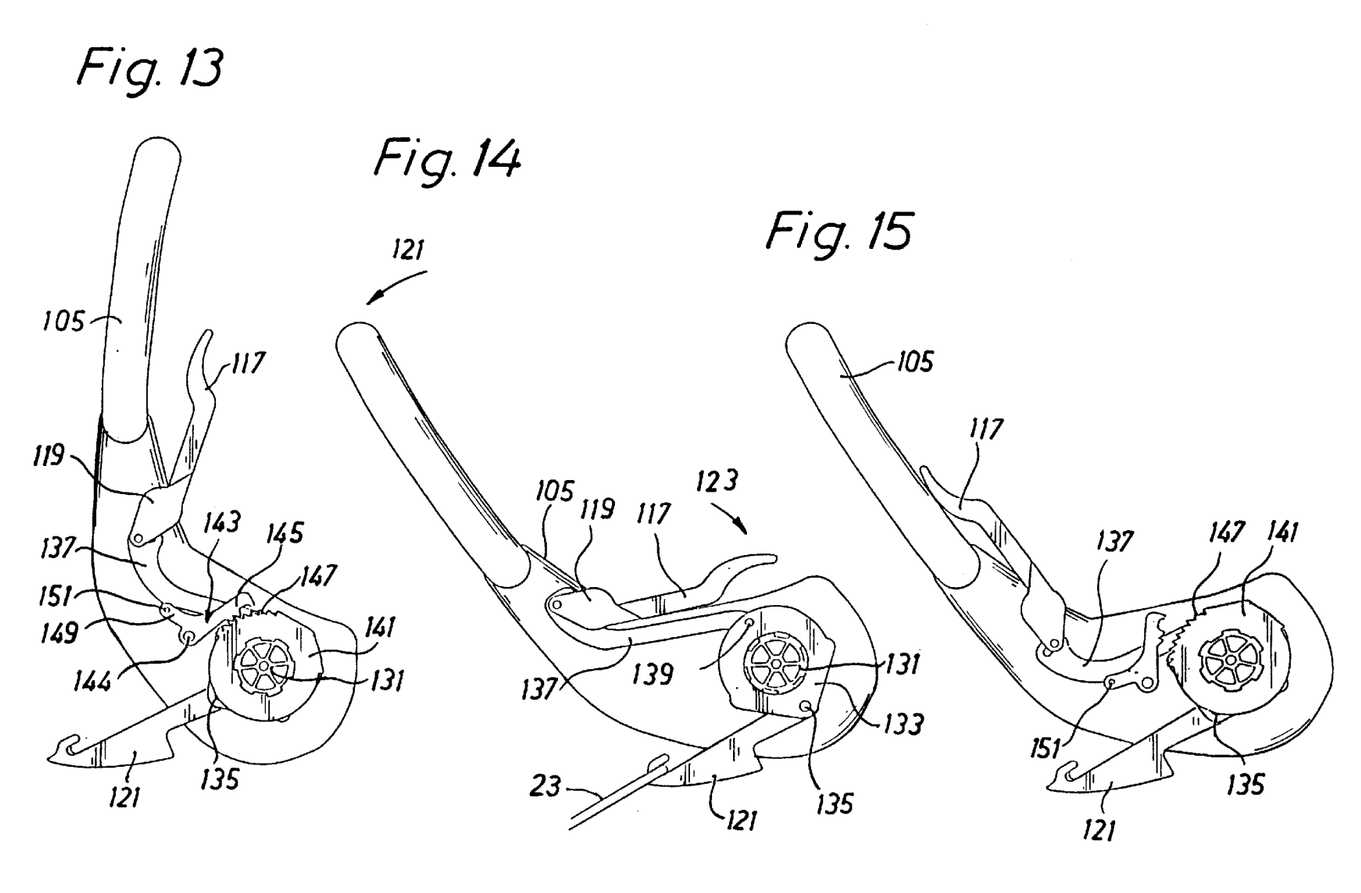
FIGS. 13–15 are schematic part side views of the supporting arm and its mounting in the child seat according to FIG. 12, illustrating different phases of the fastening according to the second embodiment.

Outside each plate 133, there is a plate 141, which along part of its periphery has a toothed segment 147 fixedly arranged on the shaft 131 by the use of inwardly directed projections which are in engagement with said splines (see FIGS. 13 and 15). On each side of the supporting arm 105, there is also a catch 143 rotatably mounted (at 144) adjacent to the plate 141, so that the hook part 145 of the catch can mesh with the toothed segment 147 on the plate 141. Close to the mounting end, the catch 143 has an essentially transversely projecting projection 149, which supports an inwardly directed pin 151 for coaction with the adjacent link arm 137, as will be described in more detail below. An after-tightening lever 117, arranged in the centre of the supporting arm 105, is foldably mounted around a "horizontal" shaft 118 (outlined in FIGS. 12–15). On each side of the mounting in the supporting arm, the lever 117 has a projecting arm part 119, on which the other end of the respective link arms 137 mentioned above is mounted with some mobility in the mounting point.

The fastening operation itself for the embodiment shown in FIGS. 12–15 will be as follows:

In a starting position according to FIG. 13, the supporting arm 105 is folded in, the lever 117 is raised up and the hook means 121 is pushed out. The locking cable 23 can now be placed in the hook means 121, after which the supporting arm 105 is folded away from the child seat 101 (see the arrow 121) into engagement with the backrest part of the passenger seat, the child seat itself being pushed forward somewhat and the locking cable 23 thereby being initially stretched. As will be appreciated, when the supporting arm 105 is lowered, the catch 143 "meshes over" the toothed segment 147 and does not impede the folding movement. However, movement in the opposite direction is prevented.

In a separate after-tightening operation, the lever 117 is now lowered (see the arrow 123) to the locked position shown in FIG. 14. As will be appreciated, in this connection, the link arm 137 is pulled in the direction away from the shaft 131, i.e. to the left in FIG. 13. This, in turn, means that the plate 133 is caused to rotate counter-clockwise to the position shown in FIG. 14, which, as will easily be appreciated, also results in the hook means 121 being pulled back, i.e. towards the child seat itself, the cable 23 being after-tightened. (For the sake of clarity, the plate 141 and the catch 143 have been omitted in FIG. 14). In the position shown in FIG. 14, the mounting between the part 119 of the lever 117 and the link arm 137 has passed a dead centre, so that an unintentional backward motion of the lever 117 is prevented.

When the fastening of the child car seat is to be undone, in a first step, the lever 117 is returned to its starting position according to FIG. 13, whereby, as will easily be appreciated, the hook means 121 is pushed out again because of the fact that the plate 133 is now caused to rotate clockwise, pushed by the link arm 137. In order to disengage the catch 143 from the toothed segment 147 and allow the supporting arm 105 to be folded back, the lever 117 is pushed up somewhat further towards the supporting arm to the position shown in FIG. 15. In this connection, the respective link arms 137 will be pushed slightly downwards and will thereby cause the pins 151 of the respective catches 143 to move downwards, so that the catches are turned somewhat counter-clockwise and are lifted off the toothed segment, as shown in FIG. 15. The supporting arm 105 can now be brought back and the locking cable 23 can easily be loosened, whereby the position shown in FIG. 13 has been regained.

Even though preferred embodiments have been described in more detail, the skilled person will appreciate that changes and modifications are possible within the scope of the appended claims. Moreover, the skilled person will appreciate that, therefore, it is possible to use the combination of a cable loop and a movable engagement means in connection with other fastening constructions which do not employ a foldable supporting arm.

What is claimed is:

1. A method of installing a rear-facing child car seat on a passenger seat in a car, the child seat including a seat part and a supporting arm projecting from the seat part, the supporting arm being pivotable relative to the seating part, the child seat having a working position in which the seating part is disposed on a seat part of the passenger seat and the supporting arm is pivoted to an unfolded position such that it is disposed against the backrest part of the passenger seat and is anchored in the unfolded position, the method comprising the steps of:

initially anchoring a child seat relative to a seat part of a passenger seat by forming an engagement between a first fastening portion of the child seat and a second fastening portion adapted to be attached at a transition between the seat part of the passenger seat and a backrest part of the passenger seat, an engaging end of the first fastening portion being adapted to be disposed at a first distance from a seat portion of the child seat when a supporting arm of the child seat is in the folded position and being adapted to be disposed at a second tightened distance from the seat portion of the child seat less than the first distance when the supporting arm is in the unfolded position; and anchoring the child seat relative to the seat part of the passenger seat by pivoting the supporting arm relative to the seating part of the child seat to an unfolded position and into contact with the backrest part of the passenger seat, thereby tightening the engagement by pivoting the supporting arm to the unfolded position.

2. A method according to claim 1, comprising the further step of further tightening the engagement with an after-tightening means.

3. A method according to claim 2, wherein the step of further tightening the engagement includes pivoting the supporting arm beyond the unfolded position.

4. A method according to claim 3, wherein the after-tightening means further tightens the engagement by retracting the first fastening portion relative to the second fastening portion.

5. A method according to claim 2, wherein the after-tightening means further tightens the engagement using increased gearing.

6. A method according to claim 5, wherein the after-tightening means further tightens the engagement by retracting the first fastening portion relative to the second fastening portion.

7. A method according to claim 2, wherein the after-tightening means further tightens the engagement by retracting the first fastening portion relative to the second fastening portion.

8. An arrangement for installing a rear-facing child car seat on a passenger seat in a car, comprising:

a child seat including a seating part and a supporting arm pivotably attached to the seating part and movable between a folded position and an unfolded position relative to the seating part, the child seat being adapted to be placed in a working position with the seating part contacting a seat part of a passenger seat of an automobile and with the supporting arm in pressing engagement with a backrest part of the passenger seat;

engagement members including a first fastening portion of the child seat and a second fastening portion adapted to be attached at a transition between the seat part and the backrest part of the passenger seat and engageable with the first fastening portion to form an engagement;

the first fastening portion having an engaging end for engagement with the second fastening portion, the first fastening portion being connected to the supporting arm such that the engaging end is adapted to be disposed at a first distance from the seating part when the supporting arm is in the folded position and the engaging end is adapted to be disposed at no more than a second tightened distance from the seating part less than the first distance when the supporting arm is in the unfolded position.

9. An arrangement according to claim 8, wherein the second fastening portion includes a locking cable with an engagement loop.

10. An arrangement according to claim 9, wherein the second fastening member is adapted to be removably attached to the passenger seat.

11. An arrangement according to claim 9, wherein the engagement is tightenable by pivoting the supporting arm in pressing relation with the backrest part of the passenger seat relative to the seating part.

12. An arrangement according to claim 8, wherein the second fastening member is adapted to be removably attached to the passenger seat.

13. An arrangement according to claim 12, wherein the engagement is tightenable by pivoting the supporting arm in pressing relation with the backrest part of the passenger seat relative to the seating part.

14. An arrangement according to claim 8, wherein the engagement is tightenable by pivoting the supporting arm in pressing relation with the backrest part of the passenger seat relative to the seating part.

15. An arrangement according to claim 14, wherein the engagement is tightenable independently of a position of the supporting arm with the after-tightening means.

16. An arrangement according to claim 8, further comprising an after-tightening means for further tightening of the engagement.

17. An arrangement according to claim 16, wherein the after-tightening means is arranged to move the first fastening member such that the engaging end is disposed at no more than a third after-tightened distance, less than the second tightened distance, from the seating part.

18. An arrangement according to claim 17, wherein the after-tightening means includes an increased gearing means.

19. An arrangement according to claim 17, wherein the after-tightening means includes a lever for operating the after-tightening means, the lever being mounted on the supporting arm.

20. An arrangement according to claim 16, wherein the after-tightening means includes an increased gearing means.

21. An arrangement according to claim 20, wherein the after-tightening means includes a lever for operating the after-tightening means, the lever being mounted on the supporting arm.

22. An arrangement according to claim 16, wherein the after-tightening means includes a lever for operating the after-tightening means, the lever being mounted on the supporting arm.

23. A method of installing a rear-facing child car seat on a passenger seat in a car, the child seat including a seat part and a supporting arm projecting from the seat part, the supporting arm being pivotable relative to the seating part, the child seat having a working position in which the seating part is disposed on a seat part of the passenger seat and the supporting arm is pivoted to an unfolded position such that it is disposed against the backrest part of the passenger seat and is anchored in the unfolded position, the method comprising the steps of:

initially anchoring a child seat relative to a seat part of a passenger seat by forming an engagement between a first fastening portion of the child seat and a second fastening portion adapted to be attached at a transition between the seat part of the passenger seat and a backrest part of the passenger seat, the first fastening portion being attached to a supporting arm of the child seat, the supporting arm being pivotably attached to a seat part of the child seat, such that an engaging end of the first fastening portion is adapted to be disposed at a first distance from a seat portion of the child seat when the supporting arm of the child seat is in the folded position and is adapted to be disposed at a second tightened distance from the seat portion of the child seat less than the first distance when the supporting arm is in the unfolded position;

anchoring the child seat relative to the seat part of the passenger seat by pivoting the supporting arm relative to the seating part of the child seat to an unfolded position and into contact with the backrest part of the passenger seat; and further tightening the engagement with an after-tightening means.

24. A method according to claim 23, wherein the step of further tightening the engagement includes pivoting the supporting arm beyond the unfolded position.

25. A method according to claim 24, wherein the after-tightening means further tightens the engagement by retracting the first fastening portion relative to the second fastening portion.

26. A method according to claim 25, wherein the after-tightening means further tightens the engagement by retracting the first fastening portion relative to the second fastening portion.

27. A method according to claim 23, wherein the after-tightening means further tightens the engagement using increased gearing.

28. A method according to claim 23, wherein the after-tightening means further tightens the engagement by retracting the first fastening portion relative to the second fastening portion.

29. An arrangement for installing a rear-facing child car seat on a passenger seat in a car, comprising:

a child seat including a seating part and a supporting arm pivotably attached to the seating part and movable between a folded position and an unfolded position relative to the seating part, the child seat being adapted to be placed in a working position with the seating part contacting a seat part of a passenger seat of an automobile and with the supporting arm in pressing engagement with a backrest part of the passenger seat;

engagement members including a first fastening portion of the child seat and a second fastening portion adapted to be attached at a transition between the seat part and the backrest part of the passenger seat and engageable with the first fastening portion to form an engagement;

the first fastening portion having an engaging end for engagement with the second fastening portion; and an after-tightening means for further tightening of the engagement wherein the after-tightening means includes a lever for operating the after-tightening means, the lever being mounted on the supporting arm.

* * * * *